(12) United States Patent
Song et al.

(10) Patent No.: US 7,451,128 B2
(45) Date of Patent: Nov. 11, 2008

(54) METHOD FOR INCREASING DATA PROCESSING EFFICIENCY

(75) Inventors: Yi Song, Shenzhen (CN); Jiangming Chen, Shenzhen (CN); Hao Yao, Shenzhen (CN); Huakun Du, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 284 days.

(21) Appl. No.: 11/252,269

(22) Filed: Oct. 17, 2005

(65) Prior Publication Data

US 2006/0074972 A1   Apr. 6, 2006

Related U.S. Application Data

(63) Continuation of application No. PCT/CN2004/000130, filed on Feb. 18, 2004.

(30) Foreign Application Priority Data

Apr. 16, 2003   (CN) ................................ 03 1 09877

(51) Int. Cl.
    *G06F 7/00*     (2006.01)
    *G06F 17/30*    (2006.01)
(52) U.S. Cl. .......................................... 707/2; 707/100
(58) Field of Classification Search ...................... 707/2
     See application file for complete search history.

(56) References Cited

U.S. PATENT DOCUMENTS

| | | | |
|---|---|---|---|
| 5,206,951 A * | 4/1993 | Khoyi et al. ................ | 719/315 |
| 5,469,567 A | 11/1995 | Okada | |
| 5,598,519 A * | 1/1997 | Narayanan .................. | 715/504 |
| 5,822,749 A | 10/1998 | Agarwal | |
| 6,457,000 B1 * | 9/2002 | Witkowski et al. ............. | 707/2 |
| 6,480,887 B1 * | 11/2002 | Hayama ..................... | 709/217 |
| 7,007,005 B2 * | 2/2006 | Rautenback et al. ........... | 707/2 |
| 7,039,669 B1 * | 5/2006 | Wong et al. ................. | 709/201 |

OTHER PUBLICATIONS

International Search Report for PCT/CN2004/000130, mailed Jun, 3, 2004.

* cited by examiner

*Primary Examiner*—Wilson Lee
*Assistant Examiner*—Nicholas E Allen
(74) *Attorney, Agent, or Firm*—Marshall, Gerstein & Borun LLP

(57) ABSTRACT

Disclosed is a method for improving data processing efficiency including the following steps: 1) assigning each client browse window a corresponding memory block in the server, taking the amount of data to be displayed in a browse window as a data block, and saving temporarily in each memory block the N data blocks of the database that are corresponding to each browse window, respectively; 2) when the data displayed in the client browse window moves, if the data block to be displayed in the browse window and the neighboring data blocks thereof are all in the memory block, moving the data in the memory block, otherwise, saving the data block to be displayed in the browse window and the neighboring data blocks thereof in the memory block, and replacing the original data blocks in the memory block; 3) the client sending data operating commands to the server, and carrying out relevant operations on the database data; 4) after finishing the operations, updating the database with the database data in the relevant memory block. The disclosed method may be easily implemented, and meanwhile it serves the purpose of saving system resource, increasing the speed of data processing, and improving the efficiency thereof.

19 Claims, 5 Drawing Sheets

METHOD FOR INCREASING DATA PROCESSING EFFICIENCY

CROSS-REFERENCES TO RELATED APPLICATIONS

This is a continuation of International Application No. PCT/CN2004/000130, which was filed on Feb. 18, 2004, and which, in turn, claimed the benefit of Chinese Patent Application No. 03109877.0, which was filed on Apr. 16, 2003, the entire disclosures of which are hereby incorporated herein by reference.

BACKGROUND OF THE DISCLOSURE

1. Field of the Technology

The present invention relates to data processing techniques and, more particularly, to a method for improving data processing efficiency.

2. Background of the Invention

With the size of database tables becoming bigger and bigger, each table can usually hold as much as tens of thousands of records, or even more. While processing the data in a database, the client configured for each data record adopts multi-window techniques Multiple Document Interface (MDI), which enables the client to open several tables simultaneously. Besides, while a database is used in a network, there are also the cases when several clients operate on one table at the same time.

In multi-window database processing, the corresponding relationship between a searching browse window and a database in the prior art is shown in FIG. 1. As shown in FIG. 1, the client browse window 101 is directly corresponding to the database table 102. In data processing, searching operation is important, for other operations, such as deleting, editing and sorting, in data processing can be only performed after the data are found by searching.

The basic procedure of data searching operation is shown in FIG. 2, which is a schematic diagram showing the data searching procedure of the prior art. As shown in FIG. 2, the client browse window 202 searches the records directly from the database 201, and the database 201 returns the found record 203 directly to the client browse window 202.

It can be seen that, ordinary data searching simply involves a direct operation on the tables in the database, therefore, when the amount of data is extraordinary large, the operation speed would be very slow. Though such a method of saving all the data in the client may reduce the times of interaction with database while searching records, large amounts of data would occupy many memory resources of the client, which is quite uneconomical. Therefore, when the amount of data is extraordinary large, the data processing efficiency of database with the method in the prior art is very low. As the amount of data to be processed in various fields, such as communications and finance, is becoming larger and larger, it is urgent to find a method for improving data processing efficiency.

SUMMARY OF THE INVENTION

In accordance with one aspect, a method is disclosed for improving data processing efficiency such that data in databases could be processed in faster speed and with higher efficiency. In that case, the method for improving data processing efficiency may include the following steps:

1) assigning each client browse window a corresponding memory block in the server, taking the amount of data that can be displayed in a browse window as one data block, and saving temporarily in each memory block the data block of each browse window in the corresponding database and N neighboring data blocks in the database, respectively;

2) when the data displayed in the client browse window need to be moved, if the data block that needs to be displayed in the browse window and the neighboring data blocks thereof are all in the memory block, the browse window corresponds to the data in the data block that needs to be displayed;

if the data block that needs to be displayed in the browse window and its neighboring data blocks thereof are not all in the memory block, inquiring the database, and saving the entire data block and the neighboring data blocks in the memory block and replacing the original data blocks stored in the memory block;

3) the client sending data operating commands to the server, and carrying out relevant operation on the database data within the memory block that is corresponding to the Client browse window; the relevant operation comprises record inquiring, record adding, record deleting, and record modifying;

4) after finishing the operations of the client browse window, closing the window, and updating the database with the database data in the memory block that is corresponding to said browse window.

It can be seen from the above description of the scheme that said method for improving data processing efficiency according to the present invention can be implemented easily. Meanwhile, it can save system resources, increase the speed of data processing, and improve the efficiency thereof.

BRIEF DESCRIPTION OF THE DRAWINGS

FIG. 8-1 is a schematic diagram showing the page turning while the current data block browsed and the neighboring data blocks thereof are within the memory block; and, FIG. 8-2 is a schematic diagram showing the page turning while the current data block browsed and the neighboring data blocks thereof are not the memory block.

DETAILED DESCRIPTION OF PREFERRED EMBODIMENTS

The preferred embodiments according to the present invention will be described in more detail hereinafter with reference to the accompanying drawings.

The disclosed method improves the data processing efficiency generally by the technique of window sliding.

Figure 3:
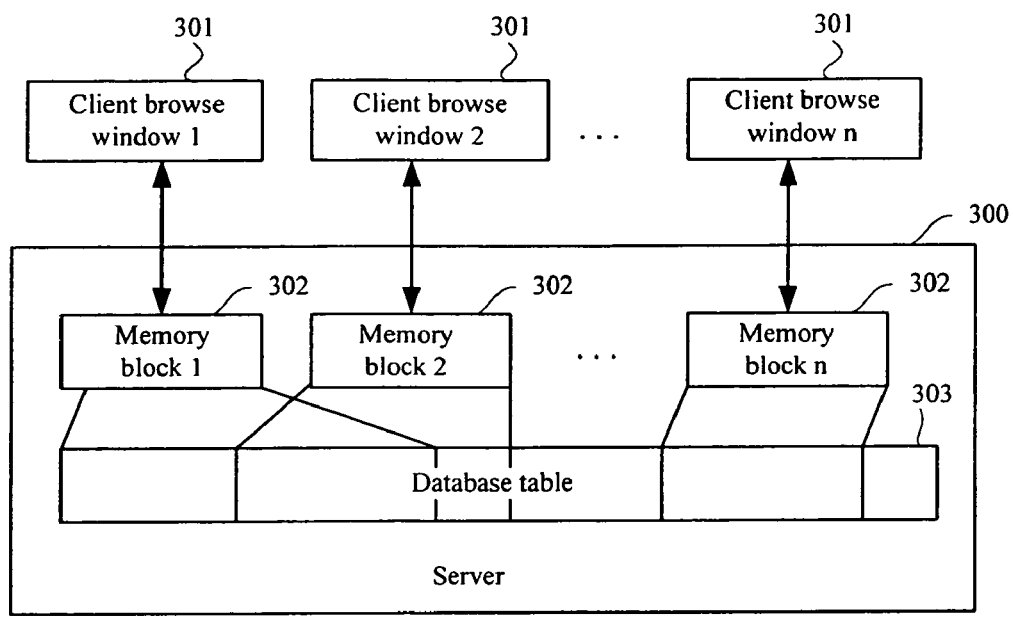
FIG. 3 is a schematic diagram of the corresponding relationship between the client browse window and the server database table in accordance with one embodiment.

First, assign each client browse window a memory block in the server, as shown in FIG. 3, which is a schematic diagram of the corresponding relationship between the client browse window and the server database table in accordance with one embodiment. Assign each client browse window 301 a corresponding memory block 302 in the server 300, take the amount of data that need to be displayed in a browse window as one data block, and save temporarily in each memory block 302 the corresponding data block and the neighboring data blocks thereof in the database 303 (totally N data blocks), respectively. The data in each memory block 302 can be overlapping or not overlapping, for example, as in FIG. 3, there is data overlapping between memory block 1 and memory block 2, but there is no data overlapping between memory block 1 and memory block n, nor between memory block 2 and memory block n. The size of each memory block 302 in server can be determined based on specific conditions, the bigger the server memory block is, the less the times of accessing the database will be. In order to avoid large resource consumption, 3~5 data blocks are the recommended size of a memory block. In the following embodiments, the memory blocks each stores three data blocks: the data block corresponding to the browse window, and the previous and next neighboring data blocks thereof.

When the data displayed in the client browse window move, if both the data block that needs to be displayed in the browse window and the neighboring data blocks thereof locate in the memory block, move the data within the memory block, if not all said data blocks locate in the memory block, save in the memory block the data block that needs to be displayed in the browse window and the neighboring data blocks thereof in the database, and replace the original data blocks in the memory block.

Figure 4:
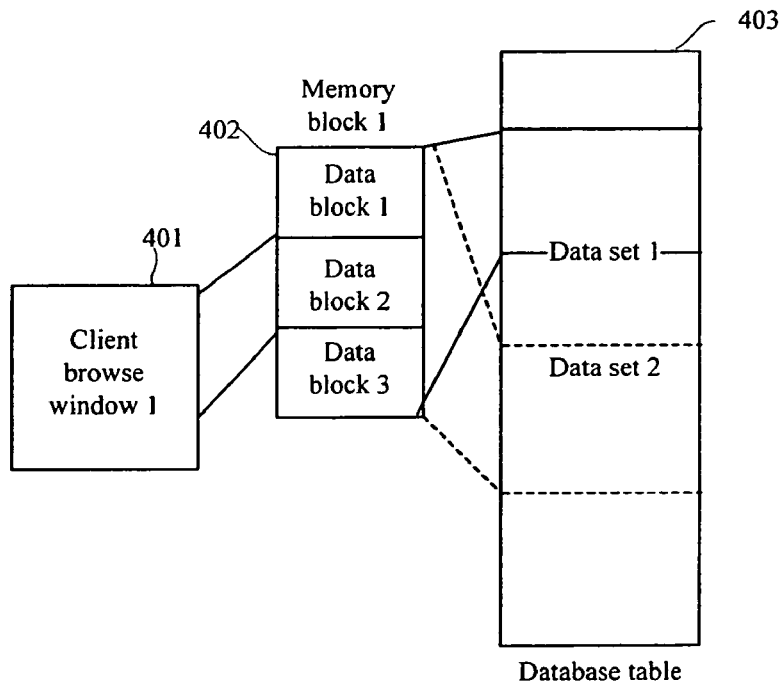
FIG. 4 is a schematic diagram of the sliding window mechanism in accordance with one embodiment.

In other words, the data saved in the memory block 302 move in the database table 303 according to the movement of client browse window 301, which forms a sliding window mapping the data of the database. As shown in FIG. 4, which is a schematic diagram showing the sliding window mechanism in accordance with the method of the preferred embodiment, data blocks 1~3 saved in the server memory block 402 which is corresponding to the client browse window 401 are the data of data set 1 in the database table 403; if the data needed by the client browse window 401 exceed said data blocks 1~3, and the needed data locate in data set 2, the data saved in the server memory block 402 can be changed to the data of data set 2.

Then, the client can send data operating commands to the server, and relevant operations on the database data within the memory block that is corresponding to the client browse window can be carried out.

Finally, after the operations in the client browse window are finished, close the window, and at the same time update the database with the database data in the memory block corresponding to said browse window.

In this way, when the client needs data, there is no need for the client to access the database table directly, it can send commands of data operation to the server 300 through client browse window 301, and operate on the database data in memory block 302 that is corresponding to client browse window 301. After finishing the operation, close client browse window 301, and update the database with the database data in memory block 302 that is corresponding to the browse window 301. Operating only on the memory block can greatly improve the speed and efficiency of the data processing. When the client opens several browse windows 301, each browse window 301 corresponds to one memory block 302, and there is no mutual interferences among the browse windows 301.

Figure 5:
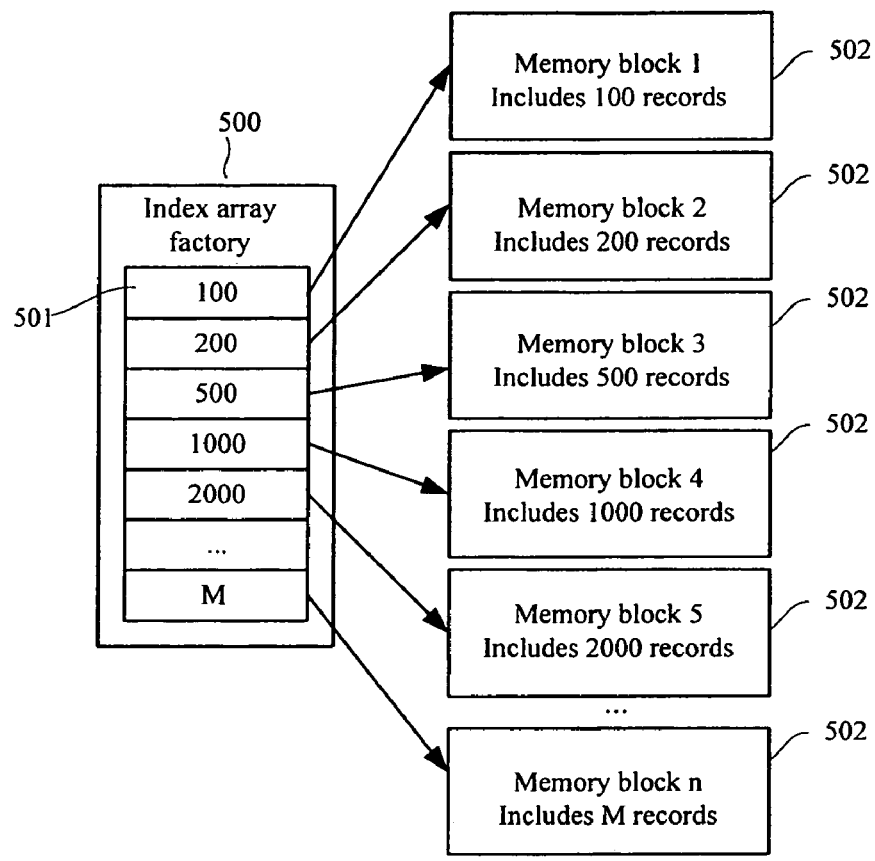
FIG. 5 is a schematic diagram showing the structure of the index data factory in accordance with one embodiment.

During the process for implementing the above scheme, a large number of memory blocks may be generated in the server, and the number of memory blocks equals to the total number of all browse windows opened in the client. Therefore, with more and more browse windows opened at the client, more memory blocks with various sizes will be generated. Meanwhile, adding or deleting data can also lead to a great deal of adding or deleting operation in the memory. In order to improve the efficiency of memory utilization and reduce the chance of generating memory fragments, in one embodiment, a memory block index array factory is established in the server for creating and reclaiming the memory blocks. The structure of the factory is shown in FIG. 5. The index array factory 500 creates an index array 501 with a corresponding size according to the requirement of the browse window on the size of the memory block, and each index array 501 corresponds to one memory block 502. When the original index array in a server is not sufficient because of the newly added data, a larger index array is directly requested from the factory, and the original array is sent to the factory for reclaiming. After receiving the abandoned array, the factory will save the array rather than deleting it immediately, if a request for assigning a new memory block is received, the reclaimed array could be delivered to the server again. In order to prevent the occupied memory from increasing infinitely, when the total amount of memory blocks exceeds a certain limit, and a request is received from the server with no suitable array available, leading to the need of updating, delete the least used memory block before creating a new index array.

One advantage of this approach is that, in ideal circumstances, after a certain period of operation, the system will have enough index arrays to meet the requirements of the server, and no more memory requests and deleting operations are needed. Moreover, in the whole processing procedure, there is no need for a series of operation of adding or deleting memory in the server only for the purpose of adding an index.

Because the operations on records in the database are extraordinarily frequent, considering the portability of database, in one embodiment, a unique Resource ID (ResID) is assigned for each record; with this ResID, it is possible to shield the discrepancy caused by accessing different databases with the record numbers of each database and reduce the workload for transplanting the database. Therefore, all the database tables take ResID as their index and create associated index table in the database, which will increase the speed of record locating and inquiring. The ResID is assigned by the server program when a record is added. Besides the ResID set according to the present embodiment, the following two objects in the system can also be used to identify the records:

a. the record number in Sybase database, which is a default configuration assigned by the database; and b. the row internal address (RowID) in Oracle database, which is also a default configuration assigned by the database;

where both the record number and the RowID are assigned automatically by the database, and both are helpful for improving the performance of the operations. However, because the record number and the RowID belong to different databases, they may be encapsulated uniformly. In contrast, ResID is the data defined by the database itself and independent from the database system used, which cause no extra trouble in supporting a database. That is why ResID may be used in certain embodiments.

The specific operations on the database data are described in more detail hereinafter:

First of all, assign the client browse window a memory block through the foregoing process: the client browse window sending to the server a memory block assigning command, the name of the database table and the number of the records that needs to be displayed in the client browse window. After receiving the command, the server finds out three data blocks in the database: the data block displayed in the browse window, the previous and next data blocks thereof. Finally, the server returns the records in the data block to be displayed in the browse window to the client.

Thereafter, it is possible to carry out operations on the database records displayed in the browse window.

Figure 6:
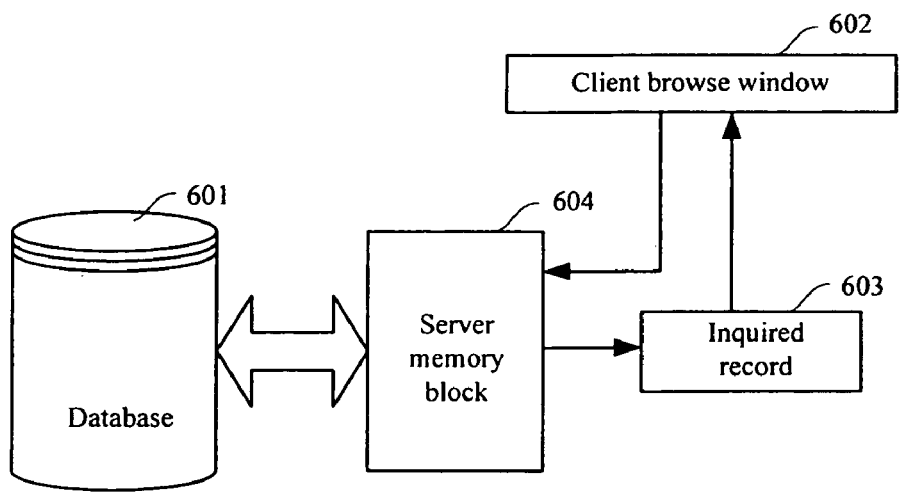
FIG. 6 is a schematic diagram of the data searching process in accordance with one embodiment.

Refer to FIG. 6 for the operation of record inquiring. FIG. 6 is a schematic diagram of data inquiring in accordance with the method of one embodiment. There are three data blocks of the database 601 stored in the server memory block 604, one of which is displayed on the client browse window 602. When the user inquires a record, the following steps will be performed: a. the client browse window 602 sending an inquiring command to the server; b. the server searching the designated data in the data blocks of memory block 604, if the inquired data is not in the memory block 604, searching the data in the database 601; after finding the data, the server sending the inquired record 603 to the client; c. the client browse window 602 displaying the result of inquiry.

Figure 7:
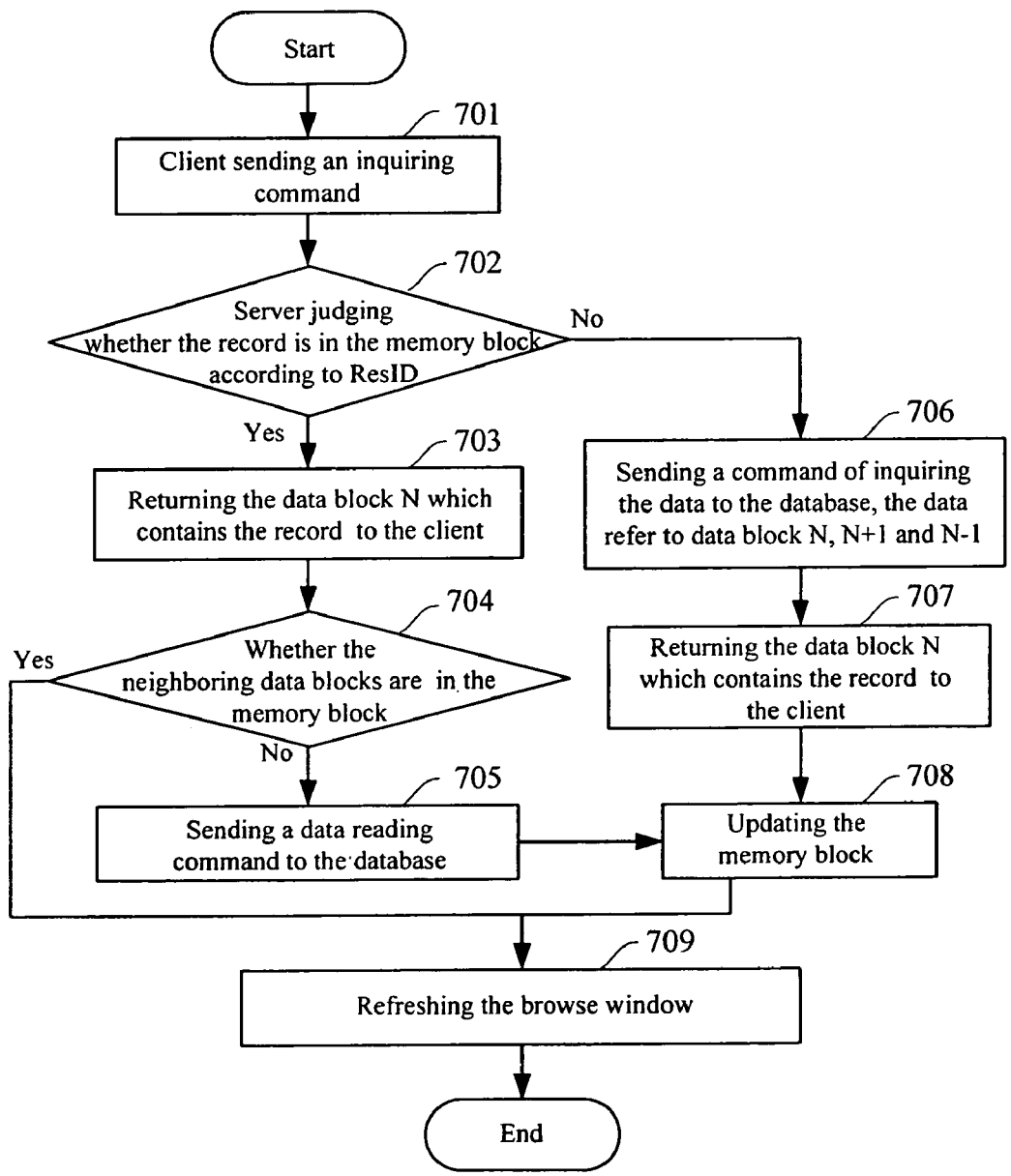
FIG. 7 is a flow chart of the record inquiring process in accordance with one embodiment.

As the operation of record inquiring is an important operation on the database, the process of record inquiring operation are described in more detail hereinafter. FIG. 7 is a flow chart for record inquiring in accordance with one embodiment, the specific process including the following steps:

Step 701: the client browse window sending to the server an inquiring command containing the name of the database table and the data designated by the user.

Step 702: according to the command, the server reading relevant record index (ResID) from the index table, judging according to the record index whether the inquired record locates in the memory block that is corresponding to the client browse window, if it is in the memory block, going to step 703; otherwise, jumping to step 706.

Step 703: returning to the client data block N where said record locates.

Step 704: judging whether the neighboring data block of the inquired data block is in the memory block, if it is, going to step 709, otherwise, going to step 705.

Step 705: sending an inquiring command to the database for said record, searching the previous and next data blocks of the data block that contains the inquired record in the database, and going to step 708.

Step 706: sending an inquiring command to the database, locating the data block N that contains the inquired record and the previous and next data blocks thereof, N+1 and N−1 in the database.

Step 707: returning data block N that contains the inquired record to the client.

Step 708: updating the memory block corresponding to the client browse window with the data block N that contains the inquired record and the previous and next data blocks thereof, N+1 and N−1.

Step 709: the client refreshing said browse window with the received inquired records.

The record adding operation includes the following steps: a. the client browse window sending the name of the database table, a record adding command and the record data to be added to the server; b. after receiving said command, the server assembling SQL sentences based on the received information, inserting the designated data in the data set of the memory block, and after the inserting process is successful, obtaining the ResID corresponding to the record, adding said ResID into the index array; c. the server sending a record adding successful message, the number of current records, and a notice for refreshing browse window to the client; d. after receiving said message of step c, the client refreshing the data in said browse window.

The record deleting operation includes the following steps: a. the client browse window sending the name of the database table, a deleting command and the index (ResID) of the record to be deleted to the server; b. after receiving the command, the server assembling SQL sentences based on the received information, and deleting the designated data from the database; c. the server sending a deleting successful message, the number of current records and a notice for refreshing browse window to the client; d. after receiving said message of step c, the client refreshing the data in said browse window.

The record modifying operation includes the following steps: a. the client browse window sending the name of the database table, a modifying command, the index (ResID) of the record to be modified and the modified record to the server; b. after receiving said command, the server assembling SQL sentences based on the received information, and modifying the designated data in the database; c. the server sending a modifying successful message and a notice for refreshing browse window to the client; d. after receiving said message in step c, the client refreshing the data in said browse window.

During the above record adding, deleting or modifying process, while refreshing the browse window that initiates said operation, the other browse windows that contain the added, deleted or modified records may be refreshed accordingly, and the refreshing method includes: going through the index arrays of all the browse windows that did not initiate the operation, if an added or a deleted record is found in a browse window in the client that did not initiate the operation, refreshing the data in said client browse window. The appending approach may be employed for refreshing the browse window with added records, i.e. appending the ResID of the newly added record at the end of the index array. In this way, the efficiency of refreshing the index array may be greatly improved.

It is necessary for the server to refresh the index table after records are added. For a sorted database, the index thereof is special to a certain extent. When the data sets are sorted according to prescribed conditions, the index (ResID) thereof are probably not in order, therefore, it is rather difficult to insert new ResID into the index table correctly. Then, the following two methods may be adopted:

1. resorting the database with the sorting condition, producing a new index table, and then instructing the client to refresh data. This method has a rather simple processing procedure, but will increase the workload of the server, and the refreshing speed of the data set is rather slow, which, nevertheless, may not be sensed in in the client.

2. appending the newly added record at the end of the index table without sorting, which is the simplest processing method, and resorting may be conducted with re-issued conditions once the user detects the added record.

Figure 1:
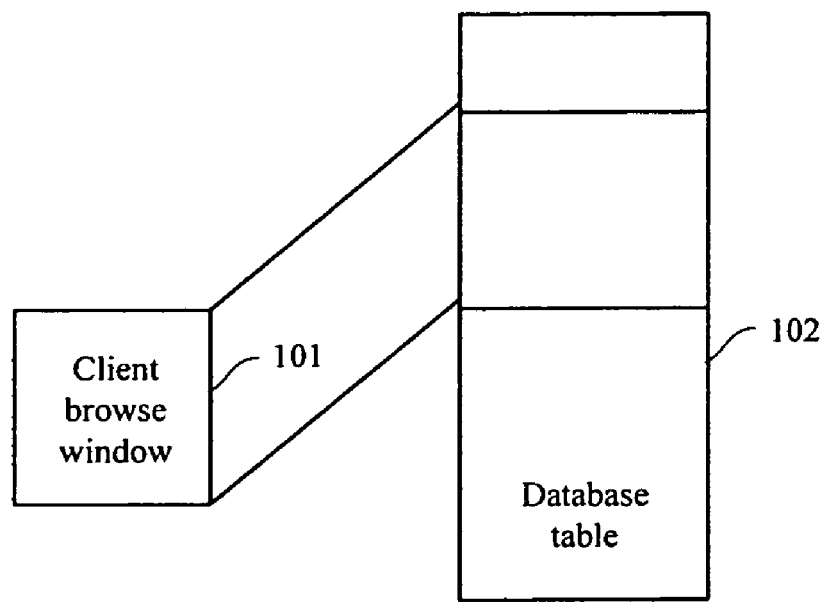
FIG. 1 is a schematic diagram of the corresponding relationship between a search browse window and a database according to the prior art.
Figure 2:
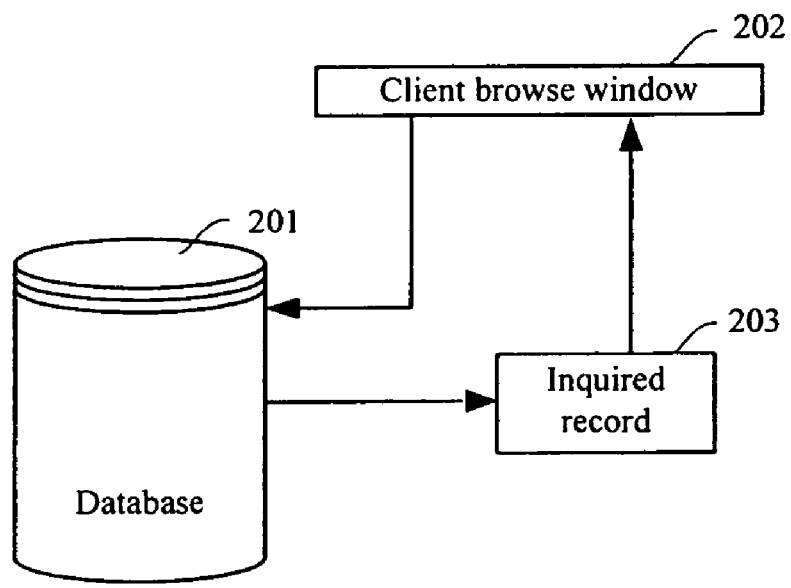
FIG. 2 is a schematic diagram of the data searching procedure according to the prior art.
Figures 1, 8:
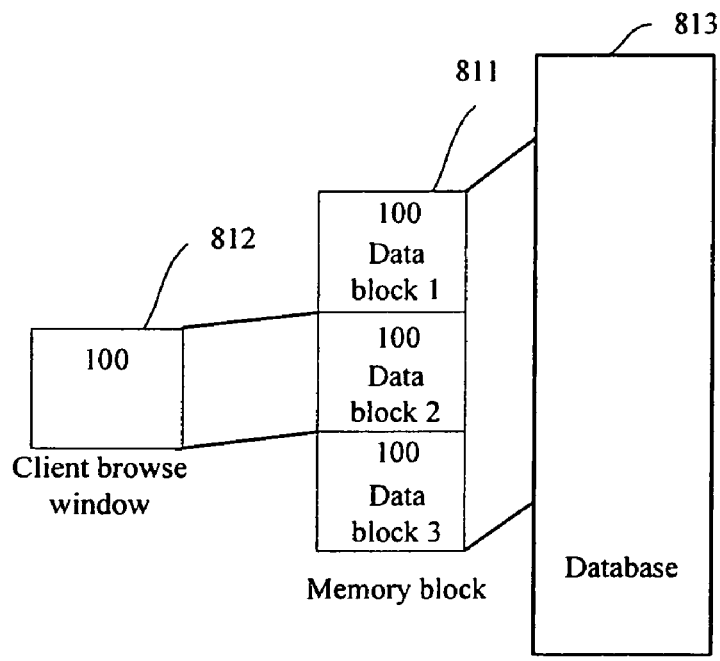
Figures 2, 8:
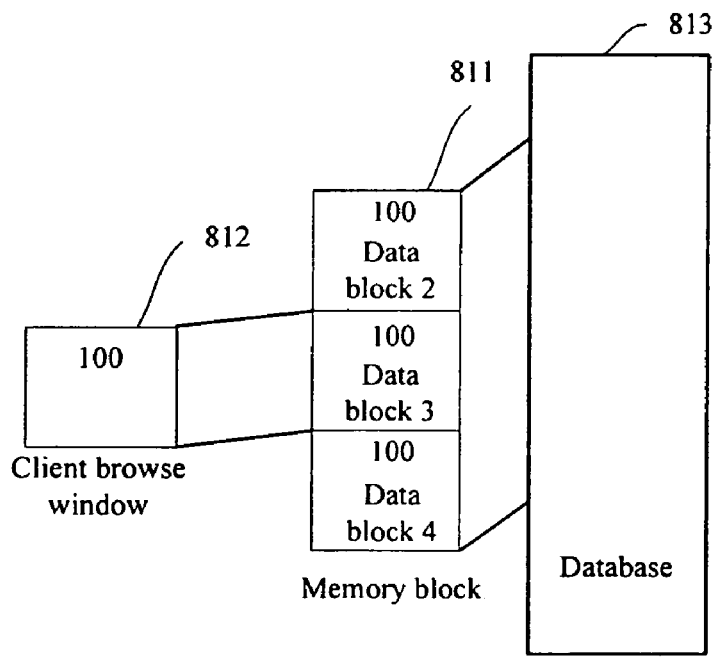

Besides, the page turning process at the client browse window is shown in FIG. 8-1 and FIG. 8-2. FIG. 8-1 is a schematic diagram of page turning while the browsed data block and the neighboring data blocks thereof are all in the memory block; FIG. 8-2 is a schematic diagram of page turning while the browsed data block and the neighboring data blocks thereof are not all in the memory block.

As shown in FIG. 8-1, suppose that the number of records that need to be displayed in client browse window 811 is 100, the currently corresponding data block is data block 1 in memory block 812, and each data block has 100 records as well, while paging down, when the data to be displayed are not in data block 1, make the client browse window 811 correspond to data block 2 in memory block 812, and return the data in data block 2 to the client. In this case, no operation on the database 813 will be carried out.

Refer to FIG. 8-2, suppose that the current client browse window 811 is corresponding to data block 2 in the memory block 812, while paging down, when the data to be displayed exceed data block 2, make the client browse window 811 correspond to data block 3 in memory block 812, and return the data in data block 3 to the client. In this case, as data block 4, the neighbor of data block 3, is not in memory block 812, delete the data in data block 1 that is not the neighbor of data block 3, send a data request to the database 813 simultaneously, and save the data of data block 4 in the memory block 812.

If paging up is carried out at this time, make the data block 2 in the memory block 812 correspond to the client browse window 811, return the data in the data block 2 to the client, delete the data block 4 simultaneously from the memory block 812, and add the data block 1 in front of the data block 2. The result thereof is then as shown in FIG. 8-1.

In practical applications, when the user presses the Page Up or Page Down button very quickly or keeps on pressing one of these buttons for a long time, calculate the page of the final location according to the times that the user has pressed the button, search the data block that is corresponding to the page as well as the neighboring data blocks thereof in the database. When the user scrolls the window to the top or the bottom of the page, display the page selection button, and then search the corresponding data block and the neighboring data blocks thereof in the database according to the selection of the user.

It can be seen from the above description, a method for improving data processing efficiency may be implemented such that system resources can be saved and the speed and efficiency of data processing can be improved.

The invention claimed is:

1. A method for improving data processing efficiency comprising:
   (A) assigning each client browse window a corresponding memory block in a server, taking the amount of data that can be displayed in a browse window as one data block, and saving temporarily in each memory block a data block corresponding to each client browse window and previous and next neighboring data blocks thereof from a database, wherein the data block corresponding to each client browse window and the respective previous and next neighboring data blocks thereof collectively form N data blocks, where N is an integer;
   (B) when the data displayed in the client browse window moves,
      if the data block that needs to be displayed in the client browse window and the previous and next neighboring data blocks thereof are all in the memory block, the client browse window corresponding to the data in the data block that needs to be displayed;
      if the data block that needs to be displayed in the browse window and the previous and next neighboring data blocks thereof are not all in the memory block, inquiring the database, and saving in the memory block the data block that needs to be displayed in the browse window and the previous and next neighboring data blocks thereof from the database and replacing the data blocks originally in the memory block;
   (C) a client sending data operating commands to the server, and carrying out the operating commands on database data in the memory block that is corresponding to the client browse window, wherein the operating commands comprise record inquiring, record adding, record deleting, and record modifying commands; and
   (D) after finishing the operating commands for the client browse window, closing the client browse window, and at the same time updating the database with the database data in the memory block that is corresponding to said browse window.

2. The method for improving data processing efficiency according to claim 1, further comprising: setting an index array factory, and creating an index array with the corresponding size to the requirement of the client browse window on the size of the memory block, the client browse window mapping the specific memory block through the corresponding index array which takes the size of the memory block as the index.

3. The method for improving data processing efficiency according to claim 2, further comprising: when the size of an index array is insufficient, requesting an index array with a larger size from the factory, and returning the old array to the factory for reclaiming, wherein the factory reserves the abandoned index array and delivers the index array again to the server when receiving a request for assigning a new memory block.

4. The method for improving data processing efficiency according to claim 2, further comprising: when the size of the needed memory block exceeds a preset size and the server cannot find a suitable index array after receiving the request for assigning a new memory block, deleting a least used memory block, and producing a new index array.

5. The method for improving data processing efficiency according to claim 3, further comprising: when the size of the needed memory block exceeds a preset size and the server cannot find a suitable index array after receiving the request for assigning a new memory block, deleting a least used memory block, and producing a new index array.

6. The method for improving data processing efficiency according to claim 1, wherein assigning the memory block in (A) further comprises:
   (A1) the client browse window sending a memory block assigning command to the server, which includes a name of database table and a number of records contained in the data block;
   (A2) after receiving said command, the server retrieving the N data blocks which comprise the data block corresponding to the client browse window and the previous and next neighboring data blocks thereof in the designated database table, and then saving said N data blocks in the memory block that is corresponding to said client browse window; and
   (A3) the server returning the records of the data block that are needed to be displayed in the browse window to the client.

7. The method for improving data processing efficiency according to claim 1, further comprising:
   configuring a unique Resource ID (ResID) for each record in the database, and creating a index table in the database taking the ResID as the record index; and
   wherein (B) further comprises:
      (B1) a record inquiring process comprising:
         (a) the client browse window sending the name of the database table and the data-inquiring information designated by the user to the server;
         (b) based on said information, the server reading the index of the relevant record from the index table, judging according to said record index whether the inquired record is in the memory block corresponding to the client browse window, if it is in the memory block, then returning the data block containing said record to the client and going to B1(c); otherwise, searching said record in the database, returning the data block containing the inquired record to the client browse window, and going to B1(d);

(c) judging whether the previous and next neighboring data blocks of the data block containing the inquired record are in the memory block that is corresponding to the client browse window, if in the memory block, then going to B1(e); otherwise, searching the previous and next neighboring data blocks in the database;

(d) updating the memory block that is corresponding to the client browse window with the data block containing the inquired records and the previous and next neighboring data blocks thereof and, (e) the client refreshing said browse window with the received inquired record;

(B2) a record adding process comprising:
(a) the client browse window sending the name of the database table, a record adding command and data of the record to be added to the server;
(b) after receiving the command, the server inserting the designated data in the data of the memory block based on the received information, once the inserting process is successful, obtaining the index of the corresponding record, and adding said record index into the record index table;
(c) the server sending an adding record successful message, the number of the current records and a notice for refreshing the browse window to the client; and,
(d) after receiving the adding record successful message in B1(c), the client refreshing the data in said browse window;

(B3) a record deleting process comprising:
(a) the client browse window sending the name of the database table, a deleting command and the record index to the server;
(b) after receiving the command, the server deleting the designated data from the memory block based on the received information;
(c) the server sending a deleting successful message, the number of the current records and a notice for refreshing the browse window to the client; and,
(d) after receiving said deleting successful message in B1(c), the client refreshing the data in the current browse window;

(B4) a record modifying process comprising:
(a) the client browse window sending the name of the database table, a modifying command, the record index and the modified record data to the server;
(b) after receiving the command, the server modifying the designated data in the memory block based on the received information;
(c) the server sending a modifying successful message and a notice for refreshing the browse window to the client; and,
(d) after receiving said modifying successful message in B1(c), the client refreshing the data in the current browse window.

8. The method for improving data processing efficiency according to claim 7, wherein (B) further comprises: refreshing the data in the client browse windows that have not initiated the operations but contain the added or deleted or modified record during the process of adding a record, deleting a record or modifying a record.

9. The method for improving data processing efficiency according to claim 7, wherein (B) further comprises: refreshing the database by resorting the data in the database based on the sorting rule, generating a new index table, and instructing the client to refresh the data.

10. The method for improving data processing efficiency according to claim 7, wherein (B) further comprises: refreshing the database by appending the newly added record to the end of the database table without sorting, and when the user detects the added record, issuing a sorting command and the sorting rule so as to resort the data.

11. The method for improving data processing efficiency according to claim 1, further comprising: when the user presses a Page Up or Page Down button more than one time, calculating a page of the final location according to the times for which the user has pressed the Page Up or Page Down button, searching the data corresponding to the page in the memory block corresponding to the current browse window, if not found, then searching said data corresponding to another page in the database.

12. The method for improving data processing efficiency according to claim 1, further comprising: displaying the page selection button when a user has scrolled to the top or to the bottom of a page, searching the corresponding data in the memory block that is corresponding to the current browse window based on the user's selection, and if not found, then searching the corresponding data in the database.

13. The method for improving data processing efficiency according to claim 3, wherein assigning the memory block in (A) further comprises:
(A1) the client browse window sending a memory block assigning command to the server, the memory block assigning command including a name of a database table and a number of records contained in the data block corresponding to the client browse window;
(A2) after receiving said command, the server retrieving the N data blocks which comprise the data block corresponding to the client browse window and the previous and next neighboring data blocks thereof in the designated database table, and then saving said N data blocks in the memory block that is corresponding to said client browse window; and
(A3) the server returning the records of the data block that are needed to be displayed in the browse window to the client.

14. The method for improving data processing efficiency according to claim 3, further comprising: when the user presses a Page Up or Page Down button more than one time, calculating a page of the final location according to the times for which the user has pressed the Page Up or Page Down button, searching the data corresponding to the page in the memory block corresponding to the current browse window, if not found, then searching said data corresponding to another page in the database.

15. The method for improving data processing efficiency according to claim 3, further comprising: displaying the page selection button when a user has scrolled to the top or the bottom of a page, searching the corresponding data in the memory block that is corresponding to the current browse window based on the user's selection, if not found, then searching the corresponding data in the database.

16. The method for improving data processing efficiency according to claim 3, further comprising:

configuring a unique Resource ID (ResID) for each record in the database, and creating an index table in the database taking the ResID as the record index;

wherein (B) further comprises:

(B1) a record inquiring process comprising:
  (a) the client browse window sending the name of the database table and the data-inquiring information designated by the user to the server;
  (b) based on said information, the server reading the index of the relevant record from the index table, judging according to said record index whether the inquired record is in the memory block corresponding to the client browse window, if it is in the memory block, then returning the data block containing said record to the client and going to B1(c); otherwise, searching said record in the database, returning the data block containing the inquired record to the client browse window, and going to B1(d);
  (c) judging whether the previous and next neighboring data blocks of the data block containing the inquired record are in the memory block that is corresponding to the client browse window, if in the memory block, then going to B1(e); otherwise, searching the previous and next neighboring data blocks in the database;
  (d) updating the memory block that is corresponding to the client browse window with the data block containing the inquired records and the neighboring data blocks thereof; and
  (e) the client refreshing said browse window with the received inquired record;

(B2) a record adding process comprising:
  (a) the client browse window sending the name of the database table, a record adding command and data of the record to be added to the server;
  (b) after receiving the command, the server inserting the designated data in the data of the memory block based on the received information, once the inserting process is successful, obtaining the index of the corresponding record, and adding said record index into the record index table;
  (c) the server sending an adding record successful message, the number of the current records and a notice for refreshing the browse window to the client; and
  (d) after receiving the adding record successful message in B2(c), the client refreshing the data in said browse window;

(B3) a record deleting process comprising:
  (a) the client browse window sending the name of the database table, a deleting command and the record index to the server;
  (b) after receiving the command, the server deleting the designated data from the memory block based on the received information;
  (c) the server sending a deleting successful message, the number of the current records and a notice for refreshing the browse window to the client; and
  (d) after receiving said deleting successful message in B3(c), the client refreshing the data in the current browse window;

(B4) a record modifying process comprising:
  (a) the client browse window sending the name of the database table, a modifying command, the record index and the modified record data to the server;
  (b) after receiving the command, the server modifying the designated data in the memory block based on the received information;
  (c) the server sending a modifying successful message and a notice for refreshing the browse window to the client; and
  (d) after receiving said modifying successful message of step B4(c), the client refreshing the data in the current browse window.

17. The method for improving data processing efficiency according to claim 16, wherein (B) further comprises: refreshing the data in the client browse windows that have not initiated the operations but contain the added or deleted or modified record during the process of adding a record, deleting a record or modifying a record.

18. The method for improving data processing efficiency according to claim 16, wherein (B) further comprises: refreshing the database by resorting the data in the database based on the sorting rule, generating a new index table, and instructing the client to refresh the data.

19. The method for improving data processing efficiency according to claim 16, wherein (B) further comprises: refreshing the database by appending the newly added record to the end of the database table without sorting, and when the user detects the added record, issuing a sorting command and the sorting rule so as to resort the data.

* * * * *